(12) United States Patent
Bandy (10) Patent No.: US 8,870,206 B1
(45) Date of Patent: Oct. 28, 2014

(54) EXTREME TRAVEL INDEPENDENT SUSPENSION SYSTEM

(71) Applicant: Ronald Scott Bandy, San Pablo, CA (US)

(72) Inventor: Ronald Scott Bandy, San Pablo, CA (US)

(*) Notice: Subject to any disclaimer, the term of this patent is extended or adjusted under 35 U.S.C. 154(b) by 0 days.

(21) Appl. No.: 14/059,062

(22) Filed: Oct. 21, 2013

(51) Int. Cl.
*B60G 7/02* (2006.01)

(52) U.S. Cl.
CPC .......................................... *B60G 7/02* (2013.01)
USPC ............................. 280/124.135; 280/124.148

(58) Field of Classification Search
USPC .................... 280/124.135, 124.136, 124.128, 280/124.148, 124.153, 788
See application file for complete search history.

(56) References Cited

U.S. PATENT DOCUMENTS

| | | | |
|---|---|---|---|
| 4,902,033 A | 2/1990 | Tonomura | |
| 5,048,860 A | 9/1991 | Kanai et al. | |
| 6,105,984 A | 8/2000 | Schmitz et al. | |
| 6,109,632 A | 8/2000 | Wei | |
| 6,203,039 B1 | 3/2001 | Gorden | |
| 7,661,689 B2 | 2/2010 | Kinugasa | |
| 8,328,212 B1* | 12/2012 | Dundon | 280/124.138 |
| 2005/0275183 A1* | 12/2005 | Amano | 280/124.128 |

OTHER PUBLICATIONS

Dirty K, Satchell linked ttb, would it work?, pirate4x4.com/General 4x4 Discussion, Jan. 11, 2011.
David Kennedy, The First Long-Travel Suspension, Off-Road.com, Apr. 15, 2008.
Litlred, 4 link ttb, TheRangerStation.com/Extreme Suspensions, Sep. 18, 2010.
Mookie, IFS for the avg Joe, pirate4x4.com/Genernal 4x4 Discussion, Jul. 16, 2012.
Spidr, Budget IFS/IRS, pirate4x4.com/General 4x4 Discussion, Jan. 8, 2013.
Proformance Drivetrain Components, Long Travel Suspension Differentials, proformance.com.aus/Products/IFS IRS Differentials, 2013
Bebe, H3 long travel build, pirate4x4.com/Hummer, Sep. 28, 2010.
Kevin Blumer, Solid Axle VS IFS, fourwheeler.com, May 1, 2012.

* cited by examiner

*Primary Examiner* — Drew Brown (57) ABSTRACT

Disclosed herein is a novel suspension concept specifically designed for handling quality as well as travel and articulation. The foundation for this concept can be viewed as the integration of two different types of independent suspension systems—the double wishbone independent suspension system and Ford's twin I-beam front suspension system. Included in this concept is a novel configuration of two pairs of links per wheel whereby the length of each link in one of the two pairs pair is analogous to the vehicle's track width. Both spring and damping functions for the suspension system are provided by the novel segmented air shock absorber, this shock absorber being disclosed in U.S. patent application Ser. No. 13/854,055. This concept discussed herein is suitable for use on either the front or rear of a vehicle, that uniquely offers the handling quality like an independent suspension system and the travel and articulation capabilities potentially superior to that of a solid axle.

6 Claims, 4 Drawing Sheets

EXTREME TRAVEL INDEPENDENT SUSPENSION SYSTEM

CROSS-REFERENCE TO RELATED APPLICATIONS

This application utilizes the segmented air shock absorber for both the spring and damping functions in the suspension system described herein. This novel shock absorber is covered in U.S. patent application Ser. No. 13/854,055.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

In 1965, the Ford Motor Company developed the twin I-beam (TIB) front suspension system for their two wheel drive F series trucks. Later in 1980, Ford incorporated a differential into the driver side beam of the TIB. Labeled the twin traction-beam (TTB) front suspension system, Ford installed this powered version of the TIB in their four wheel drive F-series trucks. Over time, both the TIB and TTB earned the reputation as the first mass-produced long travel independent front suspension systems for a vehicle. Simple yet rugged in design, the TIB and TTB front suspension systems are based on a configuration that utilizes a single beam and trailing control arm per frame side such that—beginning with, say, the front driver wheel—one end of the beam is attached to a cross-member next to the passenger side of the frame, then the beam is directed laterally towards the driver side of the frame such that the other end of the beam is attached to the driver steering knuckle. The design is completed by repeating this process beginning with the front passenger wheel. The trailing control arms act like radius arms and stabilize the beams against uncontrolled front-to-back motion. By stretching across from one frame side to the other, the beams endow the TIB and TTB with an enviable long travel capability, and by operating in conjunction with the control arms also act to invoke a change in both caster and camber angles during suspension movement.

Given that many types of production-based vehicles are routinely used in industries that involve off-road driving, e.g., construction, farming and ranching, mining, forestry, gas and oil exploration, that many obstacles—e.g., boulders, fallen trees, ravines, cliffs—encountered off-road exceed the limits of suspension travel, and that handling quality is reduced by changes in caster and camber angles during suspension travel, then automobile manufacturers and numerous other industries would greatly benefit from an independent suspension system that possessed the long travel capability characteristic of the TIB and TTB front suspension systems that also retained caster and camber angles throughout suspension travel.

In principle, the TIB and TTB suspension systems can be re-designed to maintain both caster and camber angles by adding an additional beam and trailing control arm to the existing configuration of a single beam and trailing control arm per frame side. With the addition of another beam and trailing control arm, this re-design represents a configuration of four links per frame side, or more specifically, four links per wheel. In effect, this re-design refers to a variation of the modern double wishbone (aka, double A-arm) suspension system used by automobile manufacturers since the 1960s. The present invention presents this variation of the modern double wishbone suspension system as a design concept that possesses the long travel capability characteristic of the TIB and TTB front suspension systems that also retains caster and camber angles throughout suspension travel.

The present invention represents a system of four control linkages per wheel. The system of four control linkages represents a type of independent suspension system analogous to a a double A-arm (or wishbone) suspension system, and acts to preserve both camber and caster angles as well as uncontrolled side-to-side and front-to-back motions through the full range of travel.

ADDENDUM

The present invention also represents a system of four control linkages per wheel that:
is suitable for use as either an independent front or rear suspension system;
possesses a unique suspension configuration per wheel comprising a pair of upper and lower leading links that extends laterally from the driver or passenger frame side to the passenger or driver wheel, the driver or passenger frame side being proximate the driver or passenger one wheel; and a pair of upper and lower trailing links that extends longitudinally from the mid-point of the driver or passenger frame side to the driver or passenger wheel, respectively;
in principle possesses the handling quality like an independent suspension system due to each wheel being located and stabilized by its own set of four links;
in principle can exceed the articulation capabilities of a solid axle based suspension system due to the length of its leading links approaching that of a vehicle's track width;
refers to a type of multi-link configuration known as a double wishbone suspension system; an independent suspension system highly regarded for superior handling quality;
governs the weight-bearing and damping operations with the segmented air shock absorber, the segmented air shock absorber being disclosed in patent application Ser. No. 13/854,055.

The present invention represents a novel approach to an independent suspension design. This design involves a unique configuration of the leading links—one in which each leading link is oriented laterally from one frame side to the other wheel, the one frame side being proximate the one wheel; whereby one end is attached to one frame side proximate one wheel while the other end is attached to the other wheel. The lateral orientation of the leading links mandates that a unique (1) drivetrain must be developed in order to successfully transmit power from the transmission to the wheels and (2) steering system must be developed in order to successfully transmit steering input from the steering gearbox to the front steering knuckles, as well as lock the rear non-steering knuckles into a straight-ahead orientation. The drivetrain and steering system will each be disclosed in subsequent patent applications.

Figure 4:
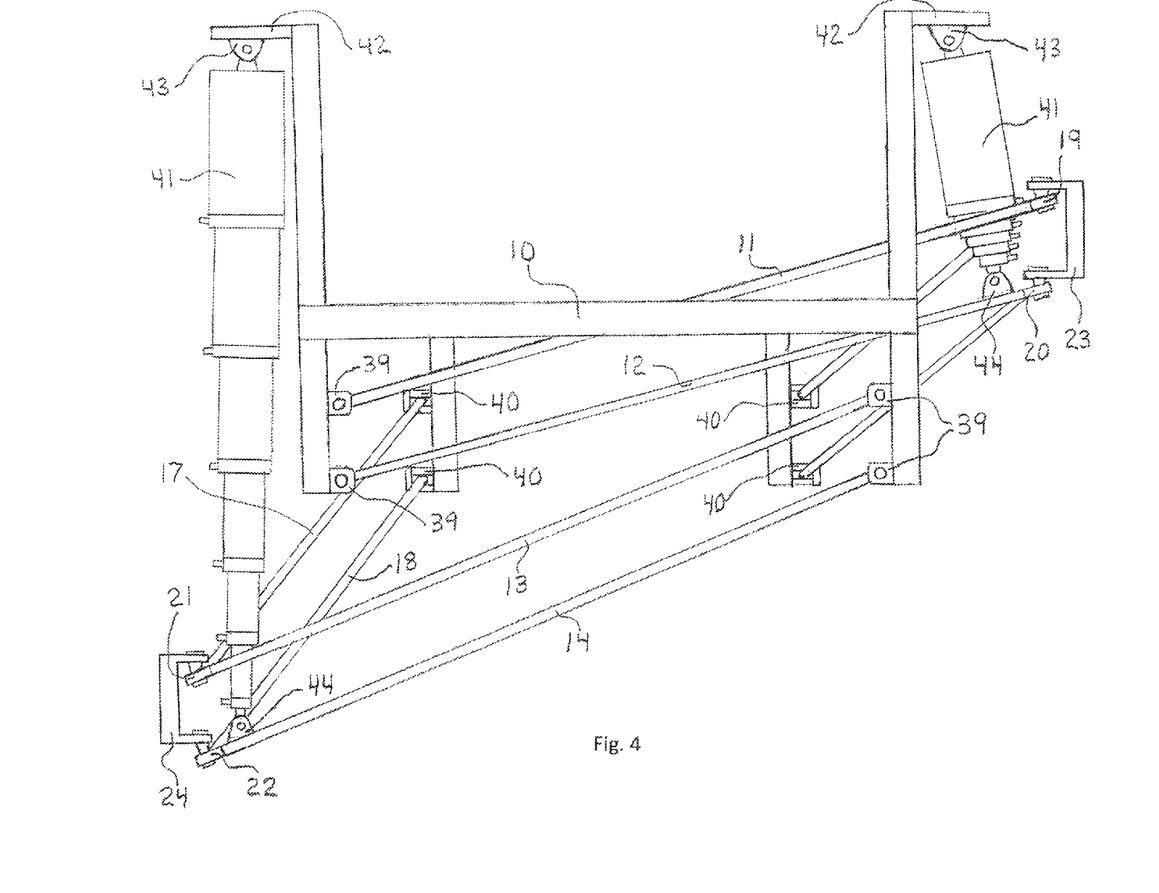
FIG. 4 is a front view of the front suspension system articulated thereof.

Spring means and damping for the present invention is accomplished by the novel segmented air shock absorber. Unknown to the art of vehicle shock absorbers, the segmented shock absorber is presented for the first time in the patent application Ser. No. 13/854,055. Endowed with the unprecedented quality to extend beyond twice its compressed length, the segmented air shock absorber is uniquely capable of affording the compression and extension properties necessary to exploit the extreme-travel capability of the present invention. This unique capability is shown in FIG. 4 in this specification.

BRIEF SUMMARY OF THE INVENTION

The present invention represents a novel extreme-travel independent suspension system comprised of four links per wheel, the four links refer to a type of double A-arm suspension system, and act to preserve both camber and caster angles as well as uncontrolled side-to-side and front-to-back motions through the full range of travel;

The present invention also represents an independent suspension system that:

is specifically designed for a 4WD vehicle;
is suitable for use as either an independent front or rear suspension system;
in principle possesses handling qualities like that of the suspension systems used by manufacturers of independent front suspension 4WD vehicles; e.g., General Motors, Ford, Dodge Ram, Toyota, and Nissan;
in principle possesses off-road characteristics that are superior to the suspension systems used by manufacturers of independent front suspension 4WD vehicles; e.g., General Motors, Ford, Dodge Ram, Toyota, and Nissan;
possesses a unique suspension configuration per wheel comprising a pair of upper and lower leading links that extends laterally from one frame side to the other wheel, the one frame side being proximate the one wheel; and a pair of upper and lower trailing links that extends longitudinally from the mid-point of the other frame side to the other wheel;
in principle possesses the handling quality like an independent suspension system due to each wheel being located and stabilized by its own set of four links;
in principle can exceed the articulation capabilities of a solid axle based suspension system due to the length of its leading links approaching that of a vehicle's track width;
refers to a type of multi-link configuration known as a double wishbone suspension system; an independent suspension system highly regarded for superior handling quality;
governs the weight-bearing and damping operations with the novel segmented air shock absorber, the segmented air shock absorber being disclosed in patent application Ser. No. 13/854,055.

BRIEF DESCRIPTION OF THE SEVERAL VIEWS OF THE DRAWING

List of Reference Numerals Utilized in the Drawings

10—frame
11—front driver upper leading link
12—front driver lower leading link
13—front passenger upper leading link
14—front passenger lower leading link
15—front driver upper trailing link
16—front driver lower trailing link
17—front passenger upper trailing link
18—front passenger lower trailing link
19—front driver upper apex bracket
20—Front driver lower apex bracket
21—front passenger upper apex bracket
22—front passenger lower apex bracket
23—front driver steering knuckle
24—front passenger steering knuckle
25—rear driver upper leading link
26—rear driver lower leading link
27—rear passenger upper leading link
28—rear passenger lower leading link
29—rear driver upper trailing link
30—rear driver lower trailing link
31—rear passenger upper trailing link
32—rear passenger lower trailing link
33—rear driver upper apex bracket
34—rear driver lower apex bracket
35—rear passenger upper apex bracket
36—rear passenger lower apex bracket
37—rear driver non-steering knuckle
38—rear passenger non-steering knuckle
39—leading link mounting brackets
40—trailing link mounting brackets
41—segmented air shock absorber
42—shock tower
43—shock upper mounting bracket
44—shock lower mounting bracket

DETAILED DESCRIPTION OF THE INVENTION

Figure 1:
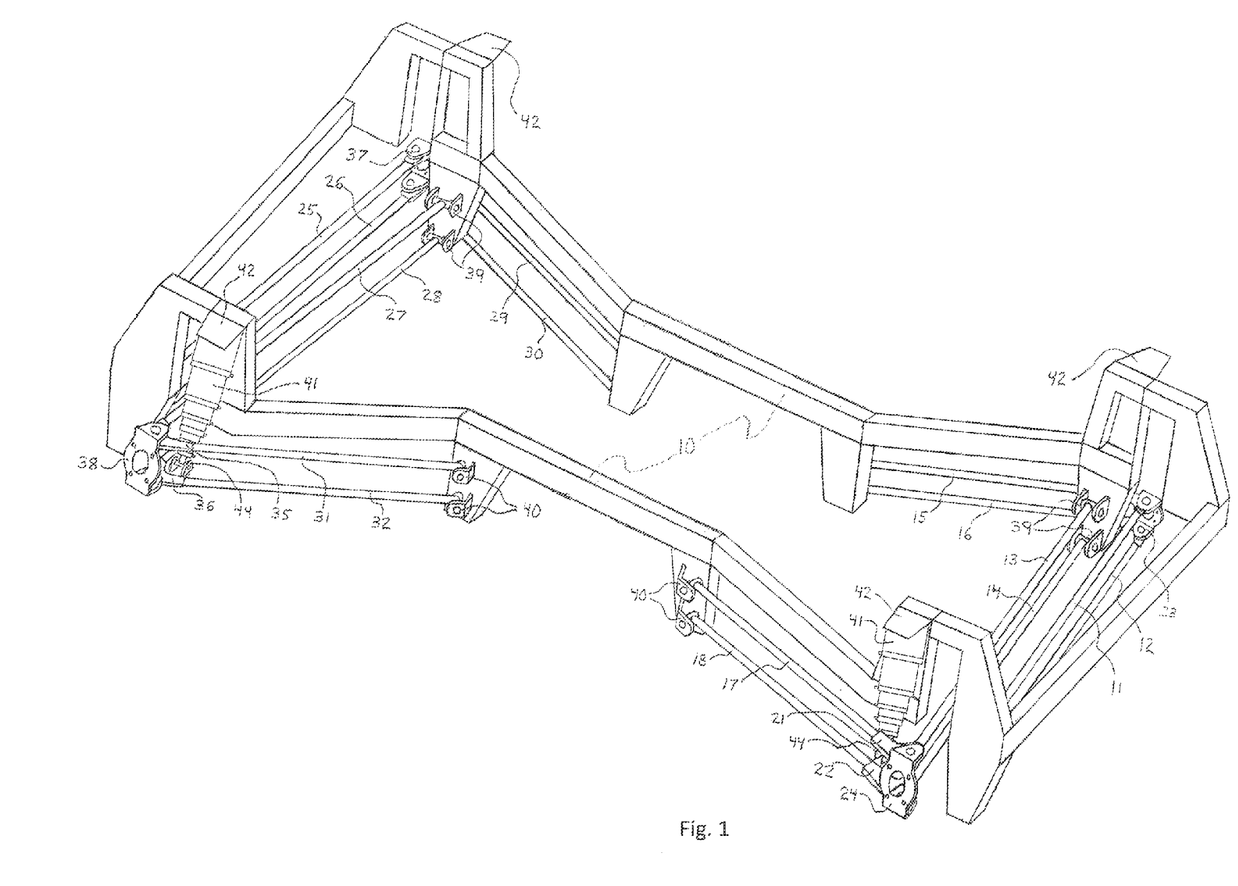
FIG. 1 is a front side perspective view of the front and rear suspension systems.
Figure 2:
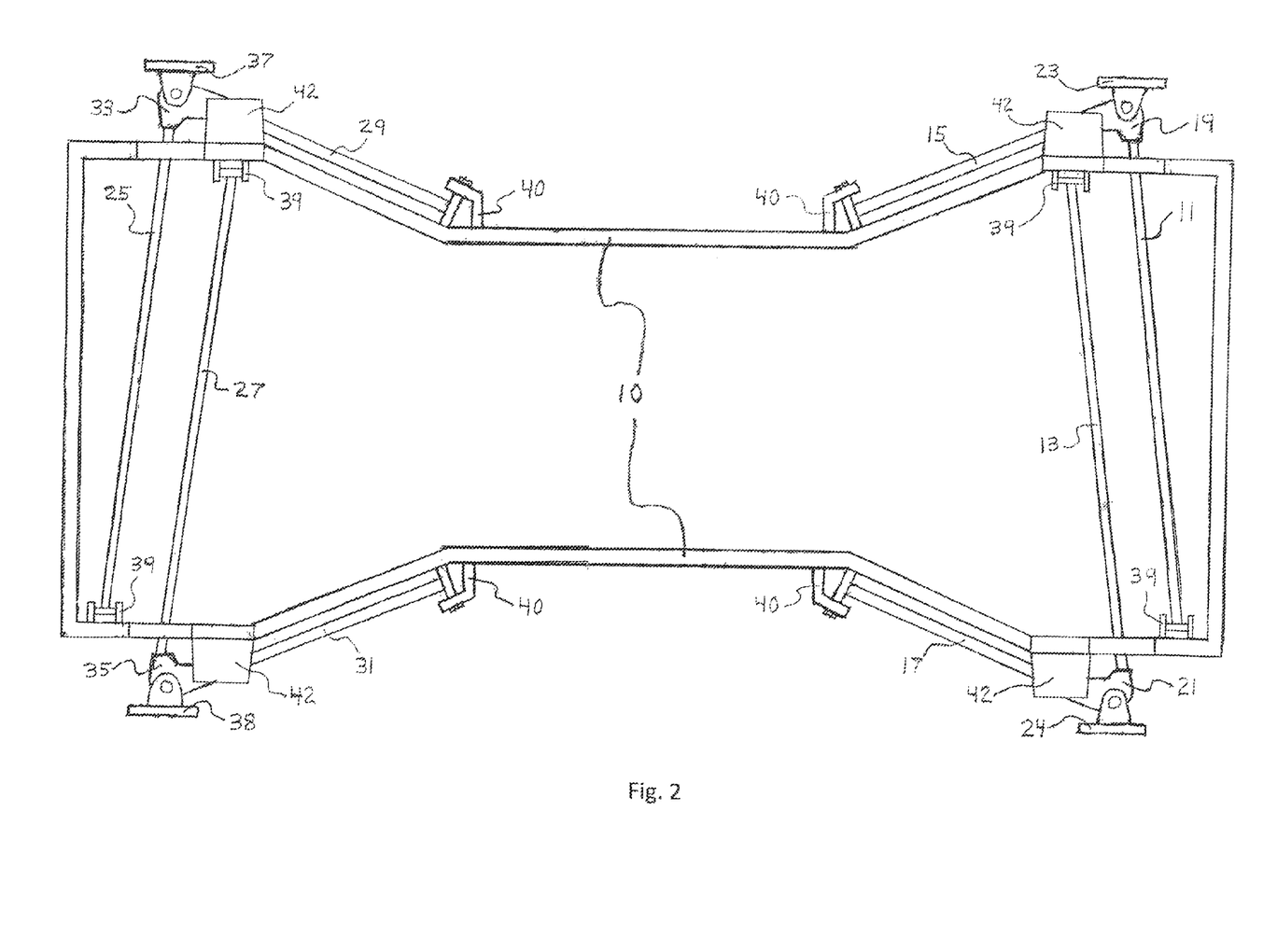
FIG. 2 is a top plan view thereof.
Figure 3:
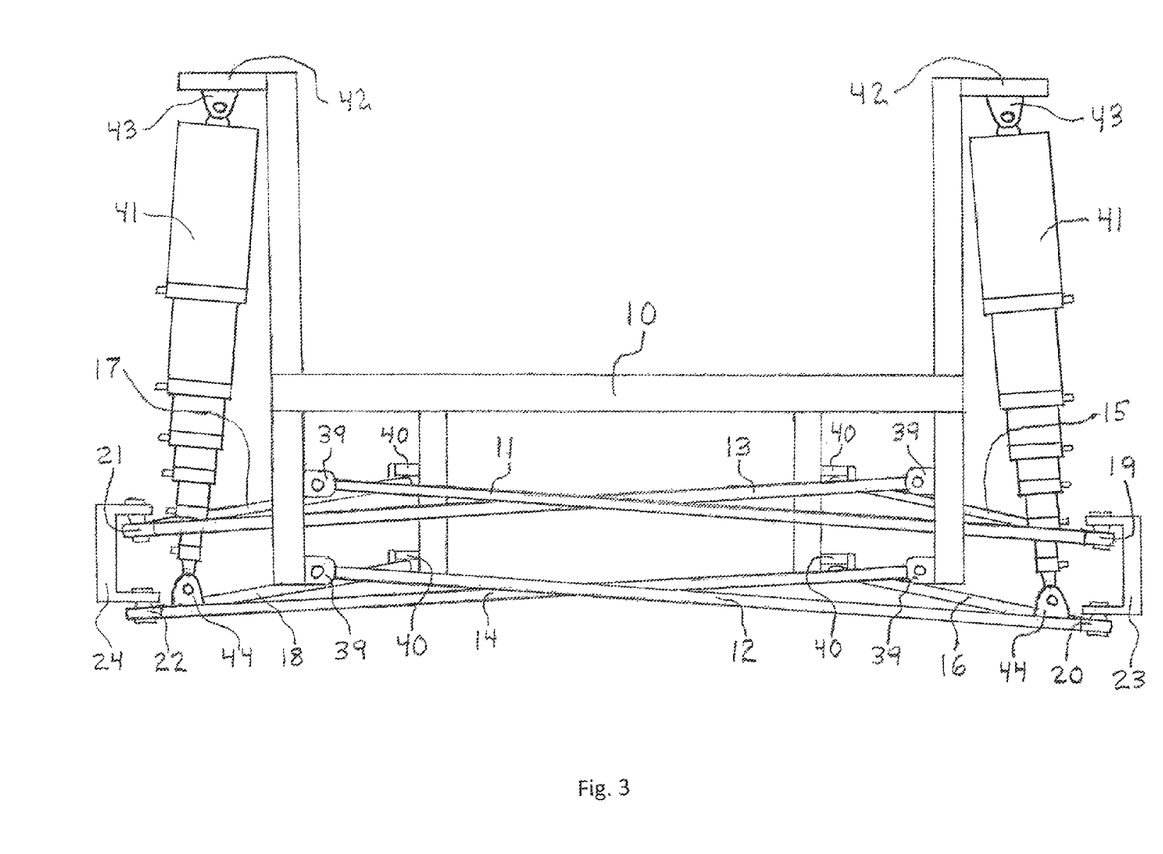
FIG. 3 is a front view of the front suspension system thereof.

Referring to FIGS. 1, 2, and 3, there is shown a vehicle's frame 10 that is comprised of a combination of the front and rear independent suspension systems. This front or rear independent suspension system involves a type of double wishbone configuration per wheel, the configuration comprising a pair of upper and lower leading links and a pair of upper and lower trailing links:

Considering the front driver wheel (not shown): the pair of upper and lower leading links, 11 and 12, respectively, is oriented laterally across the frame 10 from the front passenger frame side to the front driver wheel, the front passenger frame side being proximate the front passenger wheel (not shown); and the pair of upper and lower trailing links, 15 and 16, respectively, is oriented longitudinally and forwardly from the mid-point of the driver frame side to the front driver wheel. The one ends of the upper and lower leading links, 11 and 12, are affixed to flexible joints, the flexible joints being pivotally attached to mounting brackets 39, the mounting brackets 39 being vertically affixed to the top and bottom of the front passenger frame side proximate the front passenger wheel, respectively, each mounting bracket 39 projecting inward towards the engine bay. The one ends of the upper and lower trailing links, 15 and 16, are affixed to flexible joints, the flexible joints being pivotally attached to mounting brackets 40, the mounting brackets 40 being vertically affixed to the top and bottom of the driver frame side near its mid-point, respectively, each mounting bracket 40 projecting outward away from the engine bay. The other ends of the upper leading and trailing links, 11 and 15, are attached to the upper apex bracket 19 while the other ends of the lower leading and trailing links, 12 and 16, are attached to the lower apex bracket 20, respectively. The upper and lower apex brackets, 19 and 20, each contain a ball joint, the ball joints being pivotally attached to the top and bottom of the front driver steering knuckle 23, respectively. Suspension spring means and damping are provided by a segmented air shock absorber 41, the top of the shock being attached to a shock tower 42 with mounting brackets 43 and the bottom of the shock being attached to the lower apex bracket 20 with mounting brackets 44.

Considering the front passenger wheel: the pair of upper and lower leading links, 13 and 14, respectively, is oriented laterally across the frame 10 from the front driver frame side to the front passenger wheel, the front driver frame side being proximate the front driver wheel; and the pair of upper and lower trailing links, 17 and 18, respectively, is oriented longitudinally and forwardly from the mid-point of the passenger frame side to the front passenger wheel. The one ends of the upper and lower leading links, 13 and 14, are affixed to flexible joints, the flexible joints being pivotally attached to mounting brackets 39, the mounting brackets 39 being vertically affixed to the top and bottom of the front driver frame side proximate the front driver wheel, respectively, each mounting bracket 39 projecting inward towards the engine bay. The one ends of the upper and lower trailing links, 17 and 18, are affixed to flexible joints, the flexible joints being pivotally attached to mounting brackets 40, the mounting brackets 40 being vertically affixed to the top and bottom of the passenger frame side near its mid-point, respectively, each mounting bracket 40 projecting outward away from the engine bay. The other ends of the upper leading and trailing links, 13 and 17, are attached to the upper apex bracket 21 while the other ends of the lower leading and trailing links, 14 and 18, are attached to the lower apex bracket 22. The upper and lower apex brackets, 21 and 22, each contain a ball joint, the ball joints being pivotally attached to the top and bottom of the front passenger steering knuckle 24, respectively. Suspension spring means and damping are provided by a segmented air shock absorber 41, the top of the shock being attached to a shock tower 42 with mounting brackets 43 and the bottom of the shock being attached to the lower apex bracket 22 with mounting brackets 44.

The lateral orientation of both pairs of upper and lower leading links, 11 and 12, and 13 and 14, respectively, refers to an angular arrangement in which each pair of upper and lower leading links, 11 and 12 or 13 and 14, respectively, adopt a slightly opposed angular position about a line drawn through the front wheels. The angular arrangement is made possible by affixing the mounting brackets 39 for the pairs of upper and lower leading links, 11 and 12, and 13 and 14, to the top and bottom of the passenger and driver frame sides next to and on opposite sides of the vertical edges bordering the apertures, respectively. An aperture refers to an open space being fabricated into a driver or passenger frame side in such a manner that the other ends of a pair of upper and lower leading links, 11 and 12 or 13 and 14. can travel upward into the aperture during suspension compression thereby enhancing the travel capability of the present invention, respectively. For purposes of illustration, the pair of upper and lower leading links, 11 and 12, are angled slightly forward while the pair of upper and lower leading links, 13 and 14, are angled slightly rearward, respectively. This angular arrangement refers to the mounting brackets 39 for the pairs of upper and tower leading links, 11 and 12, and 13 and 14, being vertically affixed to the passenger and driver frame side in front of and behind the aperture, whereby being vertically affixed in front of the aperture refers to being vertically affixed between the aperture and front end of the vehicle, whereas being vertically affixed behind the aperture refers to being vertically affixed between the aperture and middle of the vehicle. This angular arrangement is required in order to prevent the pair of upper and lower leading links, 11 and 12, from interfering with the pair of upper and lower leading links, 13 and 14, respectively. Each link in the pair of upper and lower leading links, 11 and 12, or 13 and 14, lies approximately parallel to the other, respectively.

The longitudinal orientation of the upper and lower trailing links, 15 and 16, and 17 and 18, refers to an angular configuration whereby for each link in the pair of upper and lower trailing links, 15 and 16, or 17 and 18, the one ends are closer to the vehicle's center-line than are the other ends such that each pair of upper and lower trailing links, 15 and 16, or 17 and 18, is more closely aligned with the upper and lower leading links, 11 and 12, and 13 and 14, respectively. This closer alignment serves three purposes during suspension travel: one, to reduce the curvature of the longitudinal arc traced out by each front wheel thereby improving handling quality; two, to reduce the binding of the one ends of the upper and lower trailing links, 15 and 16, and 17 and 18, in their mounting brackets 40 thereby facilitating greater articulation of each front wheel; and three, to increase the turning capability of the front wheels thereby improving the vehicle's turning radius. Each link in the pair of upper and lower trailing links, 15 and 16, or 17 and 18, lies approximately parallel to one another, respectively.

Considering the rear driver wheel (not shown): the pair of upper and tower leading links, 25 and 26, respectively, is oriented laterally across the frame 10 from the rear passenger frame side to the rear driver wheel, the rear passenger frame side being proximate the rear passenger wheel (not shown); and the pair of upper and lower trailing links, 29 and 30, respectively, is oriented longitudinally and backwardly from the mid-point of the driver frame side to the rear driver wheel. The one ends of the upper and lower leading links, 25 and 26, are affixed to flexible joints, the flexible joints being pivotally attached to mounting brackets 39, the mounting brackets 39 being vertically affixed to the top and bottom of the rear passenger frame side proximate the rear passenger wheel, respectively, each mounting bracket 39 projecting inward towards the engine bay. The one ends of the upper and lower trailing links, 29 and 30, are affixed to flexible joints, the flexible joints being pivotally attached to mounting brackets 40, the mounting brackets 40 being vertically affixed to the top and bottom of the driver frame side near its mid-point, respectively, each mounting bracket 40 projecting outward away from the engine bay. The other ends of the upper leading and trailing links, 25 and 29, are attached to the upper apex bracket 33 while the other ends of the lower leading and trailing links, 26 and 30, are attached to the lower apex brocket 34, respectively. The upper and lower apex brockets, 33 and 34, each contain a ball joint, the ball joints being pivotally attached to the top and bottom of the rear driver non-steering knuckle 37, respectively. Suspension spring means and damping are provided by a segmented air shock absorber 41, the top of the shock being attached to a shock tower 42 with mounting brackets 43 and the bottom of the shock being attached to the lower apex bracket 34 with mounting brackets 44.

Considering the rear passenger wheel: the pair of upper and lower leading links, 27 and 28, respectively, is oriented laterally across the frame 10 from the rear driver frame side to the rear passenger wheel, the rear driver frame side being proximate the rear driver wheel; and the pair of upper and lower trailing links, 31 and 32, respectively, is oriented longitudinally and backwardly from the mid-point of the passenger frame side to the rear passenger wheel. The one ends of the upper and tower leading links 27 and 28 are affixed to flexible joints, the flexible joints being pivotally attached to mounting brackets 39, the mounting brackets 39 being vertically affixed to the top and bottom of the rear driver frame side proximate the rear driver wheel, respectively, each mounting bracket 39 projecting inward towards the engine bay. The one ends of the upper and lower trailing links, 31 and 32, are affixed to flexible joints, the flexible joints being pivotally attached to mounting brackets 40, the mounting brackets 40 being vertically affixed to the top and bottom of the passenger frame side near its mid-point, respectively, each mounting bracket 40 projecting outward away from the engine bay. The other ends of the upper leading and trailing links, 27 and 31, are attached to the upper apex bracket 35 while the other ends of the lower leading and trailing links, 28 and 32, are attached to the lower apex bracket 36, respectively. The upper and lower apex brackets, 35 and 36, each contain a ball joint, the ball joints being pivotally attached to the top and bottom of the rear passenger non-steering knuckle 38, respectively. Suspension spring means and damping are provided by a segmented air shock absorber 41, the top of the shock being attached to a shock tower 42 with mounting brackets 43 and the bottom of the shock being attached to the lower apex bracket 36 with mounting brackets 44.

The lateral orientation of both pairs of upper and lower leading links, 25 and 26, and 27 and 28, respectively, refers to an angular arrangement in which each pair of upper and lower leading links, 25 and 26, or 27 and 28, respectively, adopt a slightly opposed angular position about a line drawn through the rear wheels. The angular arrangement is made possible by affixing the mounting brackets 39 for the pairs of upper and lower leading links, 25 and 26, and 27 and 28, to the top and bottom of the passenger and driver frame sides next to and on opposite sides of the vertical edges bordering the apertures, respectively. An aperture refers to an open space being fabricated into a driver or passenger frame side in such a manner that the other ends of a pair of upper and lower leading links, 25 and 26, or 27 and 28, can travel upward into the aperture during suspension compression thereby enhancing the travel capability of the present invention, respectively. For purposes of illustration, the pair of upper and lower leading links, 25 and 26, are angled slightly forward while the pair of upper and lower leading links, 27 and 28, are angled slightly rearward, respectively. This angular arrangement refers to the mounting brackets 39 for the pairs of upper and lower leading links, 25 and 26, and 27 and 28, being vertically affixed to the passenger and driver frame sides in front of and behind the aperture, whereby being vertically affixed in front of the aperture refers to being vertically affixed between the aperture and rear end of the vehicle, whereas being vertically affixed behind the aperture refers to being vertically affixed between the aperture and middle of the vehicle. This angular arrangement is required in order to prevent the pair of upper and lower leading links, 25 and 26, from interfering with the pair of upper and lower leading links, 27 and 28, respectively. Each link in the pair of upper and lower leading links, 25 and 25, or 27 and 28, lies approximately parallel to the other, respectively.

The longitudinal orientation of the upper and lower trailing links, 29 and 30, and 31 and 32, refers to an angular configuration whereby for each link in the pair of upper and lower trailing links, 29 and 30, or 31 and 32, the one ends are closer to the vehicle's center-line than are the other ends such that each pair of upper and lower trailing links, 29 and 30, or 31 and 32, is more closely aligned with the upper and lower leading links, 25 and 26, and 27 and 28, respectively. This closer alignment serves two purposes during suspension travel: one, to reduce the curvature of the longitudinal arc traced out by each rear wheel thereby improving handling quality; and two, to reduce the binding of the one ends of the upper and lower trailing links, 29 and 30, and 31 and 32, in their mounting brackets 40 thereby facilitating greater articulation of each rear wheel. Each link in a pair of upper and lower trailing links, 29 and 30, or 31 and 32, lies approximately parallel to one another.

Referring to FIG 4, there is shown the front suspension system in an articulated condition, the condition referring to a link configuration in which, for purposes of illustration, the driver side upper and lower leading and trailing links, 11 and 12, and 15 and 16, are fully compressed, i.e., "bottomed out", while the passenger side upper and lower leading and trailing links, 13 and 14, and 17 and 18, are fully extended, respectively. The fully compressed and extended geometry of the links is indicative of the travel capability of the front suspension system specifically, and the present invention in general.

While the invention has been illustrated and described as embodied in a vehicle suspension system, it is not intended to be limited to the details shown, since it will be understood that various omissions, modifications, substitutions and changes in the forms and details of the device illustrated and in its operation can be made by those skilled on the art without departing in any way from the scope and spirit of the present invention.

What is claimed is:

1. A vehicle suspension system for a vehicle having a frame with respective frame sides and suspended with segmented air shock absorbers, the vehicle suspension system comprising:
   upper and lower leading links, each link having one and the other ends;
   upper and lower trailing links, each link having one and the other ends;
   upper and lower apex brackets, each bracket containing a ball joint;
   an independent suspension configuration per wheel, each configuration including the upper and lower leading links and the upper and lower trailing links, the wheel referring to a front or rear driver or passenger wheel;
   wherein the ball joints serve to pivotally attach the upper and lower apex brackets to a driver or passenger knuckle, each knuckle that is located at a front of the vehicle being steerable whereas that at a rear of the vehicle is non-steerable;
   wherein the one end of each leading or trailing link is affixed to a flexible joint, the flexible joint serving to pivotally attach the leading or trailing link to a mounting bracket;
   wherein each mounting bracket is affixed to a frame side thereby serving as a connection location for the leading or trailing link, or to a shock tower or apex bracket thereby serving as the connection location for a top or bottom of the segmented shock absorber, respectively;
   wherein the respective frame sides refer to driver and passenger frame sides, each driver or passenger frame side having a pair of apertures, the pair of apertures referring to an aperture being located near a front and rear ends of the frame; wherein the aperture refers to an open space that is fabricated into a frame side, the open space being bordered by vertical edges;
   wherein the segmented air shock absorber provides a suspension spring means and damping to the front or rear driver or passenger wheel.

2. The vehicle suspension system of claim 1 having a front independent suspension configuration wherein a pair of upper and lower leading links extends laterally from a front passenger frame side to the front driver wheel, the front passenger frame side being proximate the front passenger wheel; wherein a pair of upper and lower trailing links extends longitudinally and forwardly from a mid-point of a driver frame side to the front driver wheel;
  wherein the one ends of the upper and lower leading links are affixed to flexible joints, the flexible joints being pivotally attached to mounting brackets, the mounting brackets being vertically affixed to a top and bottom of the front passenger frame side proximate the front passenger wheel, respectively, each mounting bracket projecting inward towards an engine bay; wherein the one ends of the upper and lower trailing links are affixed to flexible joints, the flexible joints being pivotally attached to mounting brackets, the mounting brackets being vertically affixed to a top and bottom of the driver frame side near its mid-point, respectively, each mounting bracket projecting outward away from the engine bay;
  wherein the other ends of the upper leading and trailing links are attached to an upper driver side apex bracket while the other ends of the lower leading and trailing links are attached to a lower driver side apex bracket; wherein the upper and lower driver side apex brackets each contain a ball joint, the ball joints being pivotally attached to a top and bottom of a driver side steering knuckle, respectively.

3. The vehicle suspension system of claim 1 having a front independent suspension configuration wherein a pair of upper and lower leading links extends laterally from a front driver frame side to the front passenger wheel, the front driver frame side being proximate the front driver wheel; wherein a pair of upper and lower trailing links extends longitudinally and forwardly from a mid-point of a passenger frame side to the front passenger wheel;
  wherein the one ends of the upper and lower leading links are affixed to flexible joints, the flexible joints being pivotally attached to mounting brackets, the mounting brackets being vertically affixed to a top and bottom of the front driver frame side proximate the front driver wheel, respectively, each mounting bracket projecting inward towards the engine bay; wherein the one ends of the upper and lower trailing links are affixed to flexible joints, the flexible joints being pivotally attached to mounting brackets, the mounting brackets being vertically affixed to a top and bottom of the passenger frame side near its mid-point, respectively, each mounting bracket projecting outward away from the engine bay;
  wherein the other ends of the upper leading and trailing links are attached to an upper passenger side apex bracket while the other ends of the lower leading and trailing links are attached to a lower passenger side apex bracket; wherein the upper and lower passenger side apex brackets each contain a ball joint, the ball joints being pivotally attached to a top and bottom of a passenger side steering knuckle, respectively.

4. The vehicle suspension system of claim 1 having a rear independent suspension configuration wherein a pair of upper and lower leading links extends laterally from a rear passenger frame side to a rear driver wheel, the rear passenger frame side being proximate a rear passenger wheel; wherein a pair of upper and lower trailing links extends longitudinally and backwardly from a mid-point of the driver frame side to the rear driver wheel;
  wherein the one ends of the upper and lower leading links are affixed to flexible joints, the flexible joints being pivotally attached to mounting brackets, the mounting brackets being vertically affixed to a top and bottom of the rear passenger frame side proximate the rear passenger wheel, respectively, each mounting bracket projecting inward towards the engine bay; wherein the one ends of the upper and lower trailing links are affixed to flexible joints, the flexible joints being pivotally attached to mounting brackets, the mounting brackets being vertically affixed to the top and bottom of the driver frame side near its mid-point, respectively, each mounting bracket projecting outward away from the engine bay;
  wherein the other ends of the upper leading and trailing links are attached to the upper driver side apex bracket while the other ends of the lower leading and trailing links are attached to the lower driver side apex bracket; wherein the upper and lower driver side apex brackets each contain a ball joint, the ball joints being pivotally attached to a top and bottom of a driver side non-steering knuckle, respectively.

5. The vehicle suspension system of claim 1 having a rear independent suspension configuration wherein a pair of upper and lower leading links extends laterally from a rear driver frame side to the rear passenger wheel, the rear driver frame side being proximate the rear driver wheel; wherein a pair of upper and lower trailing links extends longitudinally and backwardly from a mid-point of the passenger frame side to the rear passenger wheel;
  wherein the one ends of the upper and lower leading links are affixed to flexible joints, the flexible joints being pivotally attached to mounting brackets, the mounting brackets being vertically affixed to a top and bottom of the rear driver frame side proximate the rear driver wheel, respectively, each mounting bracket projecting inward towards the engine bay; wherein the one ends of the upper and lower trailing links are affixed to flexible joints, the flexible joints being pivotally attached to mounting brackets, the mounting brackets being vertically affixed to the top and bottom of the passenger frame side near its mid-point, respectively, each mounting bracket projecting outward away from the engine bay;
  wherein the other ends of the upper leading and trailing links are attached to the upper passenger side apex bracket while the other ends of the lower leading and trailing links are attached to the lower passenger side apex bracket; wherein the upper and lower passenger side apex brackets each contain a ball joint, the ball joints being pivotally attached to a top and bottom of a passenger side non-steering knuckle, respectively.

6. The vehicle suspension system of claim 2, 3, 4, or 5 wherein the lateral orientation of the two pairs affront or rear upper and lower leading links refers to an angular arrangement in which each pair of front or rear upper and lower leading links adopts a slightly opposed angular position about a line drawn through the front or rear wheels, respectively; in particular, one pair of front or rear upper and lower leading links adopts a slightly forward angular position and the other pair of front or rear upper and lower leading links adopts a slightly rearward angular position;
  wherein the angular arrangement is reflected by affixing the mounting brackets for the pairs of upper and lower leading links to the top and bottom of the driver and passenger frame sides next to and on opposite sides of the vertical edges bordering the apertures, respectively; wherein the aperture refers to an open space being fabricated into a driver or passenger frame side in such a manner that the other ends of a pair of upper and lower leading links can travel upward into the aperture during a suspension compression thereby enhancing a travel capability of the suspension system;

wherein the slightly forward or rearward angular position refers to the mounting brackets for the pairs of upper and lower leading links being vertically affixed to the frame side in front of and behind the aperture, respectively, whereby being vertically affixed in front of the aperture refers to being vertically affixed between the aperture and front or rear end of the vehicle, whereas being vertically affixed behind the aperture refers to being vertically affixed between the aperture and middle of the vehicle.

\* \* \* \* \*